(12) United States Patent
Maruta et al.

(10) Patent No.: US 11,015,746 B2
(45) Date of Patent: May 25, 2021

(54) THREADED CONNECTION

(71) Applicants: Nippon Steel Corporation, Tokyo (JP); Vallourec Oil and Gas France, Aulnoye-Aymeries (FR)

(72) Inventors: Satoshi Maruta, Tokyo (JP); Yousuke Oku, Tokyo (JP)

(73) Assignees: Nippon Steel Corporation, Tokyo (JP); Vallourec Oil and Gas France, Aulnoye-Aymeries (FR)

( * ) Notice: Subject to any disclaimer, the term of this patent is extended or adjusted under 35 U.S.C. 154(b) by 173 days.

(21) Appl. No.: 16/469,695

(22) PCT Filed: Jan. 17, 2018

(86) PCT No.: PCT/JP2018/001242
§ 371 (c)(1),
(2) Date: Jun. 14, 2019

(87) PCT Pub. No.: WO2018/135536
PCT Pub. Date: Jul. 26, 2018

(65) Prior Publication Data
US 2019/0360619 A1  Nov. 28, 2019

(30) Foreign Application Priority Data
Jan. 18, 2017  (JP) .............................. JP2017-006319

(51) Int. Cl.
*F16L 15/06* (2006.01)
*F16L 15/00* (2006.01)
(52) U.S. Cl.
CPC ............. *F16L 15/06* (2013.01); *F16L 15/002* (2013.01); *F16L 15/007* (2013.01)
(58) Field of Classification Search
CPC ....... F16L 15/06; F16L 15/002; F16L 15/007; F16L 15/004; F16L 15/009
See application file for complete search history.

(56) References Cited

U.S. PATENT DOCUMENTS

| 4,244,607 A * | 1/1981 | Blose | F16L 15/007 |
| | | | 285/334 |
| 4,753,460 A * | 6/1988 | Tung | F16L 15/004 |
| | | | 285/331 |

(Continued)

FOREIGN PATENT DOCUMENTS

| CA | 3010955 A1 * | 11/2018 | ......... E21B 17/0423 |
| JP | H06331070 A | 11/1994 | |
| JP | 3808562 B2 | 8/2006 | |

OTHER PUBLICATIONS

English Abstract & Family List of JPH06331070A.
English Abstract & Family List of JP3808562B2.

*Primary Examiner* — David Bochna
(74) *Attorney, Agent, or Firm* — Banner & Witcoff, Ltd.

(57) ABSTRACT

A threaded connection that provides high sealing performance is provided. A threaded connection (10) includes a pin (1) and a box (2). An inner male thread (13) of the pin (1) includes a parallel portion (131). The parallel portion (131) is located at an end portion of the inner male thread (13) adjacent to the pin inner sealing surface (11), and has thread roots parallel to the pipe axis. An inner female thread (23) of the box (2) includes a tapered portion (231). The thread height in the tapered portion (231) is larger than that in the parallel portion (131). Da<Db is satisfied, where Da is the difference in diameter between adjacent thread crests (231*a*) in the tapered portion (231) in a longitudinal cross section of the pin (1) and box (2) as found when the connection is not made up, and Db is the difference between the diameter of the thread root (131*a*) in the parallel portion (13) and the maximum diameter of the pin inner sealing surface (11).

2 Claims, 10 Drawing Sheets

(56) References Cited

U.S. PATENT DOCUMENTS

| | | | | |
|---|---|---|---|---|
| 4,796,923 A | * | 1/1989 | Liggins | F16L 15/004 285/27 |
| 5,687,999 A | * | 11/1997 | Lancry | F16L 15/002 285/333 |
| 2006/0145480 A1 | * | 7/2006 | Mallis | F16L 15/06 285/390 |
| 2012/0043756 A1 | * | 2/2012 | Elder | F16L 15/06 285/333 |
| 2015/0316181 A1 | * | 11/2015 | Tejeda | F16L 15/002 285/66 |

* cited by examiner

THREADED CONNECTION

TECHNICAL FIELD

The present disclosure relates to a threaded connection, and more particularly to a threaded connection for connecting steel pipes.

BACKGROUND ART

Steel pipes called oil country tubular goods are used in oil wells and natural-gas wells (hereinafter collectively referred to as oil wells). Oil country tubular goods are connected to each other by means of a threaded connection and placed in an oil well.

Threaded connections are generally categorized as integral type and coupling type. An integral-type connection directly connects oil country tubular goods. More specifically, a female thread is provided on the inner periphery of a pipe end of one oil country tubular good, and a male thread is provided on the outer periphery of a pipe end of another oil country tubular good and the male thread is screwed into the female thread such that the oil country tubular goods are connected. A coupling-type connection connects oil country tubular goods by means of a tubular coupling. More specifically, a female thread is provided on the inner periphery of each pipe end of the coupling and a male thread is provided on the outer periphery of each pipe end of each oil country tubular good, and such a male thread is screwed into each of the female threads such that the oil country tubular goods are connected.

A pipe end of an oil country tubular good on which a male thread is provided includes an element to be inserted into a female thread, and thus is usually referred to as "pin". A pipe end of an oil country tubular good or a pipe end of a coupling on which a female thread is provided includes an element for receiving a male thread, and thus is referred to as "box".

In recent years, as oil wells have become deeper and deeper, the use of multi-stage string design has become widespread, where multiple layers of oil country tubular goods are placed in a well. With multi-stage string design, it is preferable to minimize the gap between an outer oil country tubular good and an inner oil country tubular good. In view of this, an integral type threaded connection is used. Such a threaded connection has a box with an outer diameter of about 110% of the outer diameter of the pin, for example, and thus is usually called semi-flush-type or flush-type (hereinafter collectively referred to as semi-flush-type) connection.

Japanese Patent No. 3808562 proposes a threaded connection intended to be used in a deep well. An inner seal and an outer seal are provided at the inner and outer ends, respectively, as determined along the pipe-axis direction, of the threaded connection. As a whole, the thread system is composed of two tapered-thread stages, and includes a lost thread section at the end thereof adjacent to the inner seal and another lost thread section at the end thereof adjacent to the outer seal. In the lost thread section adjacent to the inner seal, the thread roots of the male thread of the pin and the thread crests of the female thread of the box have constant diameters and are parallel to the pipe axis. In the lost thread section adjacent to the outer seal, the thread crests of the male thread of the pin and the thread roots of the female thread of the box have constant diameters and are parallel to the pipe axis.

SUMMARY OF THE DISCLOSURE

Typically, a threaded connection is required to have high sealing performance. A semi-flush-type threaded connection needs to provide high sealing performance under strict dimension constrictions. However, in the threaded connection of Japanese Patent No. 3808562, the lost thread sections discussed above may lead to a decrease in sealing performance.

An object of the present disclosure is to provide a threaded connection that provides high sealing performance.

A threaded connection according to the present disclosure connects steel pipes. The threaded connection includes a pin and a box. The pin constitutes a pipe end portion of one steel pipe. The box constitutes a pipe end portion of another steel pipe. The pin is inserted into the box such that the box and the pin are made up. The pin includes a pin inner sealing surface, a pin outer sealing surface, an inner male thread, an outer male thread, and a pin shoulder surface. The pin inner sealing surface is formed on an outer periphery of the pin at a tip portion thereof. The pin outer sealing surface is formed on the outer periphery of the pin at an end portion thereof adjacent to a pipe body of the one steel pipe. The inner male thread is located between the pin inner sealing surface and the pin outer sealing surface. The inner male thread is formed on the outer periphery of the pin. The outer male thread is located between the pin inner sealing surface and the pin outer sealing surface and closer to the pin outer sealing surface than the inner male thread is. The outer male thread is formed on the outer periphery of the pin. The pin shoulder surface is located between the inner male thread and the outer male thread. The pin shoulder surface is formed on the outer periphery of the pin. The box includes a box inner sealing surface, a box outer sealing surface, an inner female thread, an outer female thread, and a box shoulder surface. The box inner sealing surface is formed on an inner periphery of the box to correspond to the pin inner sealing surface. The box inner sealing surface is in contact with the pin inner sealing surface when the connection has been made up. The box outer sealing surface is formed on the inner periphery of the box to correspond to the pin outer sealing surface. The box outer sealing surface is in contact with the pin outer sealing surface when the connection has been made up. The inner female thread is formed on the inner periphery of the box to correspond to the inner male thread. The inner female thread mates with the inner male thread when the connection has been made up. The outer female thread is formed on the inner periphery of the box to correspond to the outer male thread. The outer female thread mates with the outer male thread when the connection has been made up. The box shoulder surface is formed on the inner periphery of the box to correspond to the pin shoulder surface. The box shoulder surface is in contact with the pin shoulder surface when the connection has been made up. The inner male thread includes a first parallel portion. The first parallel portion is located at an end portion of the inner male thread adjacent to the pin inner sealing surface. The first parallel portion includes a plurality of thread roots parallel to a pipe axis of the one steel pipe in a longitudinal cross-sectional view of the pin. The inner female thread includes a first tapered portion. The first tapered portion faces the first parallel portion when the connection has been made up. The first tapered portion has a thread height larger than that in the first parallel portion and a thread diameter decreasing toward the box inner sealing surface. The pin inner sealing surface has a maximum diameter larger than a minimum diameter of a thread crest in the first tapered portion. Da<Db is satisfied, where Da is a difference in diameter between adjacent thread crests in the first tapered portion in a longitudinal cross section of the pin and the box as found when the connection is not made up, and Db is a difference between the diameter of the thread roots in the first parallel portion and a maximum diameter of the pin inner sealing surface.

The threaded connection according to the present disclosure provides high sealing performance.

EMBODIMENTS FOR CARRYING OUT THE INVENTION

Figure 1:
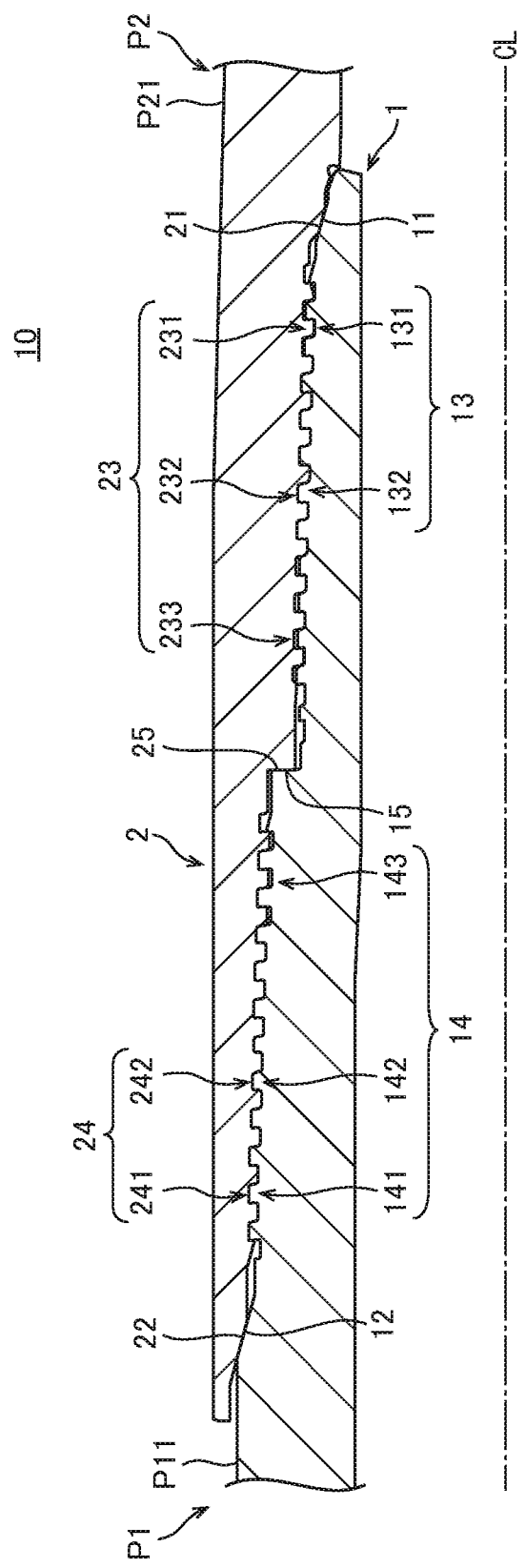
FIG. 1 is a schematic longitudinal cross-sectional view of a threaded connection according to an embodiment.

According to the latest physical test standard for threaded connections (ISO/FDIS 13679 CAL IV: 2011), the tensile, compression, external-pressure and internal-pressure loads that are repeatedly applied are larger than those according to the previous standard (ISO 13679 CAL IV: 2002). That is, threaded connections that are stronger against repeated loads are desired today. Further, as use environments for threaded connections are becoming harsher and harsher, demand for a sealing performance that provides resistance to repeated loads is growing.

In a threaded connection to which an internal pressure and an external pressure are applied, it is preferable to separately provide an inner seal for the internal pressure and an outer seal for the external pressure to improve sealing performance. Particularly, in a semi-flush-type threaded connection, it is preferable to maximize the wall thickness of the pin as measured at the inner seal in order to prevent decrease in sealing performance against the inner pressure.

In the threaded connection of Japanese Patent No. 3808562, crests on the end portion of the box female thread adjacent to the inner sealing portion are cut parallel to the pipe axis, thereby forming a lost thread section on the box. Thus, the thread height of the female thread as measured at its end adjacent to the inner sealing portion is smaller than the thread height of the male thread as measured at its corresponding end. This prevents the pin inner sealing surface and crests of the box female thread from contacting each other during make-up even if the wall thickness of the pin as measured at the inner seal is increased.

However, in the threaded connection of Japanese Patent No. 3808562, in areas with the lost thread section, a large gap is created between thread crests of the male thread and thread roots of the female thread and between thread roots of the male thread and thread crests of the female thread when the connection has been made up. As such, it is difficult to maintain sealing performance when repeated loads are applied.

For example, when mainly a load from the internal pressure is applied to the threaded connection of Japanese Patent No. 3808562, the tip portion of the pin deforms in such a manner that its diameter increases until thread crests or thread roots of the male thread contact the female thread of the box. If the gap between thread crests of the male thread and thread roots of the female thread and the gap between thread roots of the male thread and thread crests of the female thread are large, the amount of deformation of the pin during application of a load is large, as well. When a load is applied repeatedly, plastic deformation accumulates, resulting in a decrease in the sealing performance of the threaded connection. As discussed above, in recent years, demand for resistance to repeated loads, among other parameters, has been growing, and high sealing performance must be maintained even when a load is applied repeatedly to the threaded connection.

Based on the above-discussed findings, the present inventors arrived at the threaded connection according to the embodiment.

A threaded connection according to the embodiment connects steel pipes. The threaded connection includes a pin and a box. The pin constitutes a pipe end portion of one steel pipe. The box constitutes a pipe end portion of another steel pipe. The pin is inserted into the box such that the box and the pin are made up. The pin includes a pin inner sealing surface, a pin outer sealing surface, an inner male thread, an outer male thread, and a pin shoulder surface. The pin inner sealing surface is formed on an outer periphery of the pin at a tip portion thereof. The pin outer sealing surface is formed on the outer periphery of the pin at an end portion thereof adjacent to a pipe body of the one steel pipe. The inner male thread is located between the pin inner sealing surface and the pin outer sealing surface. The inner male thread is formed on the outer periphery of the pin. The outer male thread is located between the pin inner sealing surface and the pin outer sealing surface and closer to the pin outer sealing surface than the inner male thread is. The outer male thread is formed on the outer periphery of the pin. The pin shoulder surface is located between the inner male thread and the outer male thread. The pin shoulder surface is formed on the outer periphery of the pin. The box includes a box inner sealing surface, a box outer sealing surface, an inner female thread, an outer female thread, and a box shoulder surface. The box inner sealing surface is formed on an inner periphery of the box to correspond to the pin inner sealing surface. The box inner sealing surface is in contact with the pin inner sealing surface when the connection has been made up. The box outer sealing surface is formed on the inner periphery of the box to correspond to the pin outer sealing surface. The box outer sealing surface is in contact with the pin outer sealing surface when the connection has been made up. The inner female thread is formed on the inner periphery of the box to correspond to the inner male thread. The inner female thread mates with the inner male thread when the connection has been made up. The outer female thread is formed on the inner periphery of the box to correspond to the outer male thread. The outer female thread mates with the outer male thread when the connection has been made up. The box shoulder surface is formed on the inner periphery of the box to correspond to the pin shoulder surface. The box shoulder surface is in contact with the pin shoulder surface when the connection has been made up. The inner male thread includes a first parallel portion. The first parallel portion is located at an end portion of the inner male thread adjacent to the pin inner sealing surface. The first parallel portion is parallel to a pipe axis of the one steel pipe in a longitudinal cross-sectional view of the pin and has a constant diameter. The inner female thread includes a first tapered portion. The first tapered portion faces the first parallel portion when the connection has been made up. The first tapered portion has a thread height larger than that in the first parallel portion and a thread diameter decreasing toward the box inner sealing surface. The pin inner sealing surface has a maximum diameter larger than a minimum diameter of a thread crest in the first tapered portion. $Da < Db$ is satisfied, where $Da$ is a difference in diameter between adjacent thread crests in the first tapered portion in a longitudinal cross section of the pin and the box as found when the connection is not made up, and $Db$ is a difference between the diameter of the thread roots in the first parallel portion and a maximum diameter of the pin inner sealing surface (first arrangement).

In the first arrangement, in a portion of the pin inner male thread adjacent to the inner sealing portion is provided a first parallel portion having thread roots parallel to the pipe axis. On the other hand, the first tapered portion of the box inner female thread that faces that first parallel portion has thread crests that are not parallel to the pipe axis and have a thread height larger than the thread height of the first parallel portion. Thus, when the connection has been made up, no large gap is created between the first parallel portion of the inner male thread and the first tapered portion of the inner female thread even when the interference of the inner sealing portions is considered. Thus, even when a load from the internal or external pressure is applied to the threaded connection, thread crests or thread roots of the first parallel portion of the inner male thread contact the inner female thread when the load is still low, thereby limiting the deformation of portions near the inner seal. This will reduce the amount of accumulation of plastic deformation, thereby providing high sealing performance even when a load from the internal or external pressure is repeatedly applied to the threaded connection.

In the first arrangement, the first tapered portion of the inner female thread has thread crests that are not parallel to the pipe axis and have a thread height that is larger than the thread height of the first parallel portion of the inner male thread. Thus, the length of the portions of the inner female thread and inner male thread that completely engage each other is increased over arrangements where crests in portions of the inner female thread adjacent to the inner seal are cut. This will reduce the deformation of the pin or box in response to tensile and compression loads, thereby providing high sealing performance.

In the first arrangement, the difference between the diameter of the thread root of the first parallel portion of the inner male thread and the maximum diameter of the pin inner sealing surface is larger than the difference between the diameters of adjacent thread crests in the first tapered portion of the inner female thread. This will prevent the pin inner sealing surface from contacting thread crests of the inner female thread of the box during make-up even if thread crests of the inner female thread of the box are not cut.

Starting from the above-described threaded connection, the outer female thread may include a second parallel portion, and the outer male thread may include a second tapered portion. The second parallel portion is located at an end portion of the outer female thread adjacent to the box outer sealing surface. The second parallel portion includes thread roots parallel to the pipe axis of the other steel pipe. The second tapered portion faces the second parallel portion when the connection has been made up. The second tapered portion has a thread height smaller than that in the second parallel portion and a thread diameter increasing toward the pin outer sealing surface. The box outer sealing surface has a minimum diameter larger than a maximum diameter in a thread crest of the second tapered portion. $Dc < Dd$ is satisfied, where $Dc$ is a difference in diameter between adjacent thread crests in the second tapered portion in a longitudinal cross section of the pin and the box as found when the connection is not made up, and $Dd$ is a difference between the diameter of the thread roots in the second parallel portion and a minimum diameter of the box outer sealing surface (second arrangement).

In the second arrangement, at the end portion of the outer female thread adjacent to the outer seal is provided a second parallel portion that has thread roots parallel to the pipe axis. The thread height of the second parallel portion is larger than the thread height of the second tapered portion of the outer male thread facing that second parallel portion. Thus, the gap between the second parallel portion of the outer female thread and the second tapered portion of the outer male thread when the connection has been made up is reduced such that, when a load from the internal or external pressure is applied to the thread connection, these portions contact each other when the load is still low. Further, the length of the portions of the outer male thread and outer female thread that completely engage each other is increased. This will reduce the deformation of portions of the threaded connection near the outer sealing portion, thereby further improving sealing performance.

Embodiments will now be described with reference to the drawings. The same and corresponding elements in the drawings are labeled with the same characters, and the same description will not be repeated. For ease of explanation, the drawings may show elements in a simplified or schematic manner, or may not show some elements.

[Overall Construction of Threaded Connection]

FIG. 1 is a schematic longitudinal cross-sectional view of a threaded connection 10 according to an embodiment. The threaded connection 10 connects steel pipes P1 and P2. Longitudinal cross-sectional view means a cross-sectional view taken along a plane containing the pipe axis CL of the steel pipes P1 and P2.

As shown in FIG. 1, the threaded connection 10 includes a pin 1 and a box 2. The pin constitutes one pipe end of the steel pipe P1. The box 2 constitutes one pipe end of the steel pipe P2. The pin 1 is inserted into the box 2 such that the box 2 and pin 1 are made up. Although not shown, a box 2 is provided at the other pipe end of the steel pipe P1. A pin 1 is provided at the other pipe end of the steel pipe P2. That is, the threaded connection 10 is an integral-type threaded connection.

The threaded connection 10 is a so-called semi-flush-type threaded connection. Thus, for example, the outer diameter of the box 2 should be 110% or less of the outer diameter of the pin 1.

The pin 1 includes a pin inner sealing surface 11, a pin outer sealing surface 12, an inner male thread 13, an outer male thread 14, and a pin shoulder surface 15. The pin inner sealing surface 11, inner male thread 13, pin shoulder surface 15, outer male thread 14 and pin outer sealing surface 12 are arranged in this order as it goes from the tip of the pin 1 toward the pipe body P11 of the steel pipe P1. In the following description, as determined along the pipe-axis direction, being located further toward the tip of the pin 1 may be referred to as inner or inward, and being located further toward the pipe body P11 may be referred to as outer or outward.

The pin inner sealing surface 11 is located on the tip portion of the pin 1. The pin inner sealing surface 11 is formed on the outer periphery of the pin 1. The pin inner sealing surface 11 has a diameter generally increasing toward the inner male thread 13.

The pin outer sealing surface 12 is provided on the end portion of the pin 1 adjacent to the pipe body P11 of the steel pipe P1. The pin outer sealing surface 12 is formed on the outer periphery of the pin 1. The pin outer sealing surface 12 has a diameter generally increasing toward the pipe body P11.

The pin inner sealing surface 11 and pin outer sealing surface 12 may be constituted by, for example, the peripheral surface of a solid of revolution obtained by rotating an arc about the pipe axis CL or the peripheral surface of a truncated cone whose axis is represented by the pipe axis CL, or a combination of two or more such surfaces.

The inner male thread 13 is located between the pin inner sealing surface 11 and pin outer sealing surface 12. The inner male thread 13 is formed on the outer periphery of the pin 1. The inner male thread 13 includes a parallel portion 131 and a tapered portion 132. The parallel portion 131 is located closer to the pin inner sealing surface 11 than the tapered portion 132 is.

The outer male thread 14 is located between the pin inner sealing surface 11 and pin outer sealing surface 12 and closer to the pin outer sealing surface 12 than the inner male thread 13 is. That is, the outer male thread 14 is located between the inner male thread 13 and pin outer sealing surface 12. The outer male thread 14 is formed on the outer periphery of the pin 1. The outer male thread 14 includes tapered portions 141 and 142 and a parallel portion 143.

The pin shoulder surface 15 is located between the inner male thread 13 and outer male thread 14. The pin shoulder surface 15 is a toroidal surface crossing the pipe-axis direction. The pin shoulder surface 15 may be substantially perpendicular to the pipe-axis direction, or may be inclined such that the outer periphery is located inward or outward as determined along the pipe-axis direction. The pin shoulder surface 15 separates the inner and outer male threads 13 and 14 from each other as determined along the pipe-axis direction.

The box 2 includes a box inner sealing surface 21, a box outer sealing surface 22, an inner female thread 23, an outer female thread 24, and a box shoulder surface 25. The box inner sealing surface 21, inner female thread 23, box shoulder surface 25, outer female thread 24 and box outer sealing surface 22 are arranged in this order as it goes outward along the pipe-axis direction.

The box inner sealing surface 21 is formed on the inner periphery of the box 2 to correspond to the pin inner sealing surface 11. The box inner sealing surface 21 has a diameter generally increasing toward the inner female thread 23. The box inner sealing surface 21 is in contact with the pin inner sealing surface 11 when the pin 1 and box 2 have been made up.

The pin inner sealing surface 11 and box inner sealing surface 21 have an amount of interference. That is, when the connection is not made up, the pin inner sealing surface 11 has a diameter larger than the diameter of the box inner sealing surface 21. Thus, as the pin 1 is screwed into the box 2, the pin inner sealing surface 11 and box inner sealing surface 21 contact each other, and, when the connection has been made up, fitting adhesion is achieved to provide an interference fit. Thus, the pin and box inner sealing surfaces 11 and 21 form an inner seal through metal-to-metal contact.

The box outer sealing surface 22 is formed on the inner periphery of the box 2 to correspond to the pin outer sealing surface 12. The box outer sealing surface 22 has a diameter that generally increases as it goes outward along the pipe-axis direction. The box outer sealing surface 22 is in contact with the pin outer sealing surface 12 when the connection has been made up.

The pin outer sealing surface 12 and box outer sealing surface 22 have an amount of interference. That is, when the connection is not made up, the pin outer sealing surface 12 has a diameter larger than the diameter of the box outer sealing surface 22. Thus, as the pin 1 is screwed into the box 2, the pin outer sealing surface 12 and box outer sealing surface 22 contact each other, and, when the connection has been made up, fitting adhesion is achieved to provide an interference fit. Thus, the pin and box outer sealing surfaces 12 and 22 form an outer seal through metal-to-metal contact.

The box inner sealing surface 21 and box outer sealing surface 22 may be constituted by, for example, the peripheral surface of a solid of revolution obtained by rotating an arc about the pipe axis CL or the peripheral surface of a truncated cone whose axis is represented by the pipe axis CL, or a combination of two or more such surfaces.

The inner female thread 23 is formed on the inner periphery of the box 2 to correspond to the inner male thread 13. The inner female thread 23 includes tapered portions 231 and 232 and a parallel portion 233. The inner female thread 23 mates with the inner male thread 13 when the connection has been made up. When the connection has been made up, the inner female thread 23, together with the inner male thread 13, forms an inner seal.

The outer female thread 24 is formed on the inner periphery of the box 2 to correspond to the outer male thread 14. The outer female thread 24 includes a parallel portion 241 and a tapered portion 242. The outer female thread 24 mates with the outer male thread 14 when the connection has been made up. When the connection has been made up, the outer female thread 24, together with the outer male thread 14, forms an outer seal.

The box shoulder surface 25 is formed on the inner periphery of the box 2 to correspond to the pin shoulder surface 15. The box shoulder surface 25 is a toroidal surface crossing the pipe-axis direction. The box shoulder surface 25 separates the inner and outer female threads 23 and 24 from each other as determined along the pipe-axis direction. When the connection has been made up, the box shoulder surface 25 is in contact with the pin shoulder surface 15. The box shoulder surface 25 has a shape that allows surface contact with the pin shoulder surface 15.

As the pin 1 is screwed into the box 2, the pin and box shoulder surfaces 15 and 25 contact each other and become pressed against each other. The pin and box shoulder surfaces 15 and 25 form a shoulder assembly.

[Construction of Inner End Portion of Threaded Connection]

Figure 2:
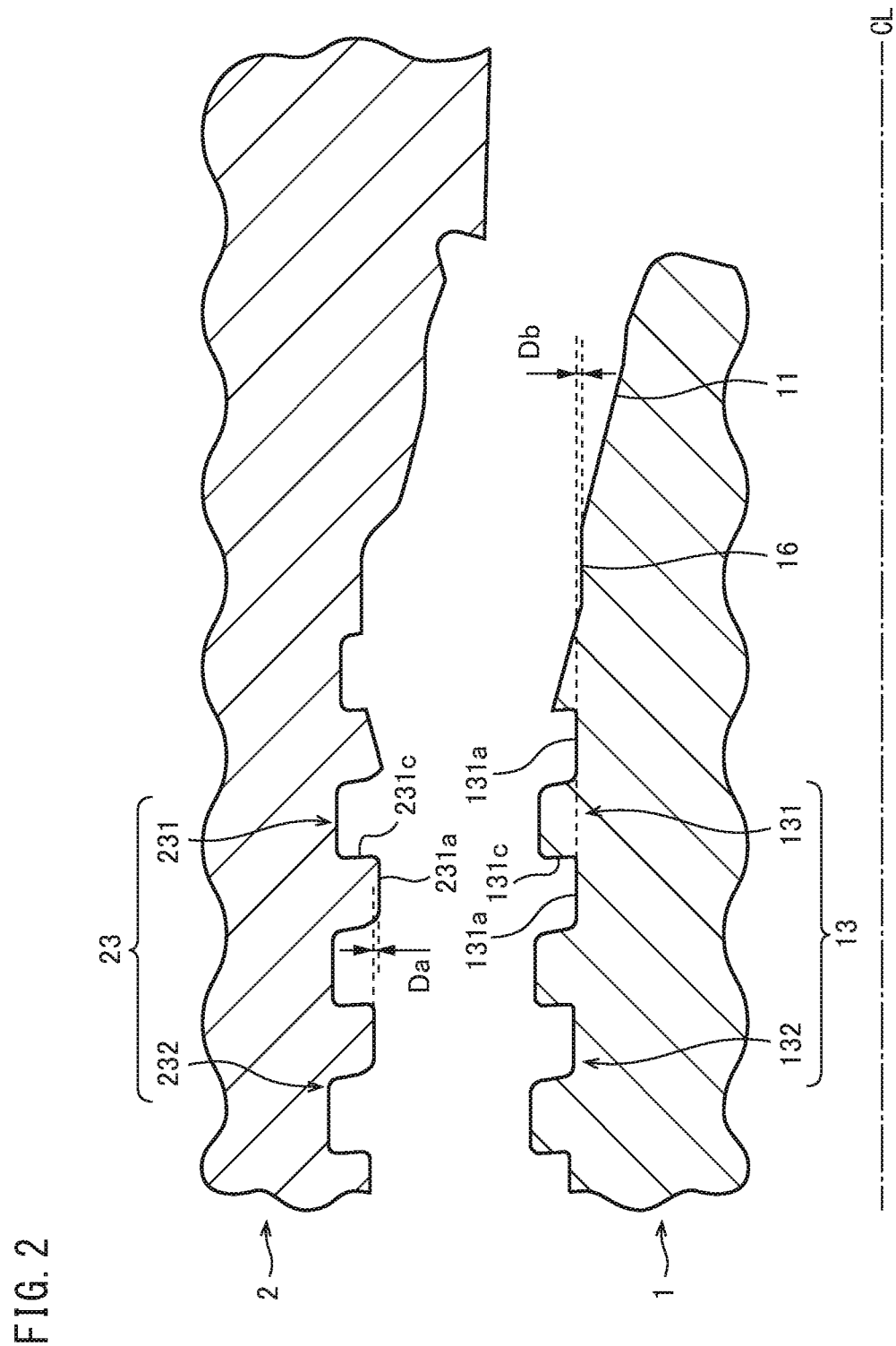
FIG. 2 is a longitudinal cross-sectional view of the inner end portion, as determined along the pipe-axis direction, of the threaded connection of FIG. 1, as found when the connection is not made up.

FIG. 2 is a longitudinal cross-sectional view of the inner end portion, as determined along the pipe-axis direction, of the threaded connection 10, as found when the connection is not made up.

As shown in FIG. 2, the parallel portion 131 is provided at the end of the inner male thread 13 of the pin 1 that is adjacent to the pin inner sealing surface 11. The parallel portion 131 has thread roots that are parallel to the pipe axis CL. In the parallel portion 131, the thread roots have a constant diameter. The thread crests in the parallel portion 131 need not be parallel to the pipe axis CL.

The parallel portion 131 is located at the end of the inner male thread 13 that is adjacent to the pin inner sealing surface 11. The parallel portion 131 cover at least two pitches of the inner male thread 13 that are located adjacent to the pin inner sealing surface 11. As such, in a longitudinal cross-sectional view of the pin 1, the parallel portion 131 includes at least two thread roots 131a. In the present embodiment, in a longitudinal cross-sectional view of the pin 1, the parallel portion 131 includes a plurality of thread roots 131a. The thread roots 131a in a longitudinal cross-sectional view have the same diameter.

The tapered portion 132 is located outward of the parallel portion 131 as determined along the pipe axis direction. The tapered portion 132 is located adjacent to the parallel portion 131. The tapered portion 132 extends to the outer end, as determined along the pipe-axis direction, of the inner male thread 13. The tapered portion 132 has a thread diameter that gradually increases as it goes outward along the pipe-axis direction. That is, the tapered portion 132 is a portion generally constituted by a tapered male thread. However, an end portion of the tapered portion 132 adjacent to the pin shoulder surface 15 has a constant thread diameter. That is, in a longitudinal cross-sectional view of the pin 1, an end portion of the tapered portion 132 adjacent to the pin shoulder surface 15 includes a plurality of thread crests with the same diameter (not shown).

The tapered portion 231 of the inner female thread 23 of the box 2 corresponds to the parallel portion 131 of the inner male thread 13 of the pin 1. The tapered portion 232 of the inner female thread 23 corresponds to the portion of the tapered portion 132 of the inner male thread 13 that has a thread diameter increasing as it goes outward along the pipe-axis direction, i.e. portion excluding the end portion adjacent to the pin shoulder surface 15. The tapered portions 231 and 232 have a thread diameter that gradually increases as it goes outward along the pipe-axis direction. The parallel portion 233 of the inner female thread 23 (FIG. 1) corresponds to the end portion of the tapered portion 132 adjacent to the pin shoulder surface 15. The parallel portion 233 includes a plurality of thread crests with the same diameter (not shown) in a longitudinal cross-sectional view of the box 2.

In a longitudinal cross-sectional view of the box 2, the tapered portion 231 includes a plurality of thread crests 231a. In a longitudinal cross-sectional view, thread crests 231a located inward as determined along the pipe-axis direction have smaller diameters than thread crests 231a located outward as determined along the pipe-axis direction. When the connection has been made up, the thread crests 231a face the thread roots 131a of the parallel portion 131 of the inner male thread 13.

The thread height in the tapered portion 231 of the inner female thread 23 is larger than the thread height in the parallel portion 131 of the inner male thread 13. Thread height may be represented by load-flank height, for example. That is, the difference between the outermost diameter and innermost diameter of the load flank 231c in the tapered portion 231 is larger than the difference between the outermost diameter and innermost diameter in the load flank 131c of the corresponding parallel portion 131.

The tapered portion 231 of the inner female thread 23 has an amount of interference with respect to the parallel portion 131 of the inner male thread 13. That is, when the connection is not made up, the diameter of the thread roots 131a of the parallel portion 131 is larger than the minimum diameter of the thread crests 231a of the corresponding tapered portion 231. However, the amount of interference between the parallel portion 131 and tapered portion 231 is smaller than the amount of interference between the pin inner sealing surface 11 and box inner sealing surface 21.

The difference in diameter between adjacent thread crests 231a in the tapered portion 231 of the inner female thread 23 in a longitudinal cross-sectional view of the box 2 when the connection is not made up will be denoted by Da. The difference between the diameter of the thread roots 131a of the parallel portion 131 of the inner male thread 13 and the maximum diameter of the pin inner sealing surface 11 in a longitudinal cross-sectional view of the pin 1 when the connection is not made up will be denoted by Db. The pin 1 and box 2 are designed such that Db is larger than Da. That is, when the connection is not made up, Da<Db.

When the connection is not made up, the maximum diameter of the pin inner sealing surface 11 is larger than the minimum diameter of the thread crests 231a of the tapered portion 231. The maximum diameter of the pin inner sealing surface 11 may be represented by, for example, the diameter of the end, adjacent to the inner male thread 13, of the pin inner sealing surface 11 having a diameter that substantially increases toward the inner male thread 13. The maximum diameter of the pin inner sealing surface 11 is smaller than the diameter of the thread roots 131a of the parallel portion 131.

In the present embodiment, the pin 1 includes a cylindrical portion 16 located between the inner male thread 13 and pin inner sealing surface 11. The cylindrical portion 16 has a substantially constant outer diameter. The outer diameter of the cylindrical portion 16 is smaller than the diameter of the thread roots 131a of the parallel portion 131. The outer diameter of the cylindrical portion 16 is substantially equal to the maximum diameter of the pin inner sealing surface 11. The outer peripheral surface of the cylindrical portion 16 is not in contact with the box 2 when the connection has been made up.

[Construction of Outer End Portion of Threaded Connection]

Figure 3:
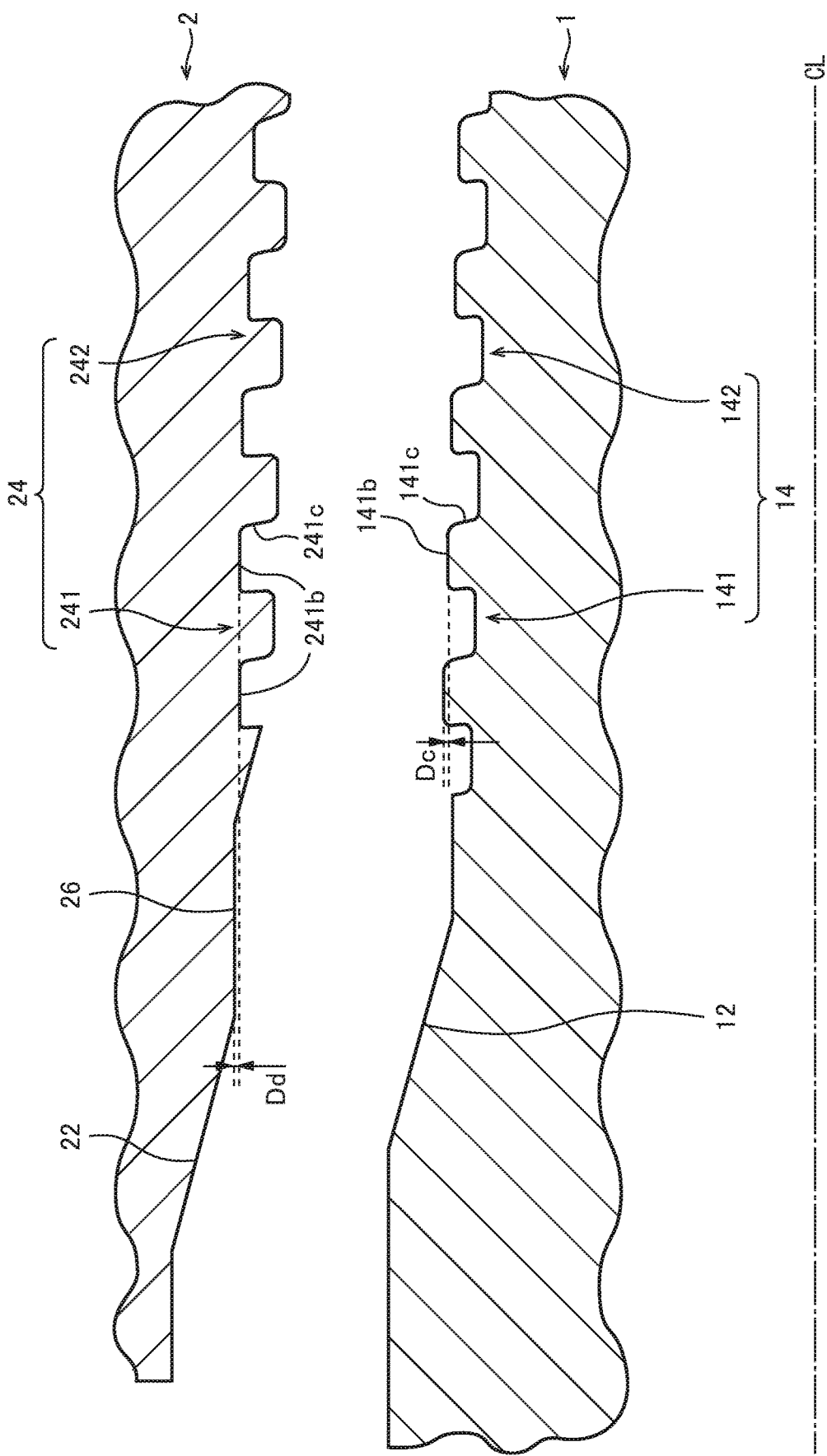
FIG. 3 is a longitudinal cross-sectional view of the outer end portion, as determined along the pipe-axis direction, of the threaded connection of FIG. 1, as found when the connection is not made up.

FIG. 3 is a longitudinal cross-sectional view of the outer end portion, as determined along the pipe-axis direction, of the threaded connection 10, as found when the connection is not made up.

As shown in FIG. 3, the parallel portion 241 is provided at the end of the outer female thread 24 of the box 2 that is adjacent to the box outer sealing surface 22. In the parallel portion 241, the thread roots are parallel to the pipe axis CL. In the parallel portion 241, the thread roots have a constant diameter. The thread crests in the parallel portion 241 need not be parallel to the pipe axis CL.

The parallel portion 241 is located at the end of the outer female thread 24 adjacent to the box outer sealing surface 22. The parallel portion 241 covers at least two pitches of the outer female thread 24 that are adjacent to the box outer sealing surface 22. Thus, in a longitudinal cross-sectional view of the box 2, the parallel portion 241 includes two or more thread roots 241b. In the present embodiment, in a longitudinal cross-sectional view of the box 2, the parallel portion 241 includes a plurality of thread roots 241b. The thread roots 241b in a cross-sectional view have the same diameter.

The tapered portion 242 is located inward of the parallel portion 241 as determined along the pipe-axis direction. The tapered portion 242 is located adjacent to the parallel portion 241. The tapered portion 242 extends to the inner end, as determined along the pipe-axis direction, of the outer female thread 24. The tapered portion 242 has a thread diameter that gradually increases as it goes outward along the pipe-axis direction. That is, the tapered portion 242 is a portion generally constituted by a tapered female thread. However, an end portion of the tapered portion 242 adjacent to the box shoulder surface 25 has a constant thread diameter. That is, in a longitudinal cross-sectional view of the box 2, an end portion of the tapered portion 242 adjacent to the box shoulder surface 25 includes a plurality of thread roots with the same diameter (not shown).

The tapered portion 141 of the outer male thread 14 of the pin 1 corresponds to the parallel portion 241 of the outer female thread 24 of the box 2. The tapered portion 142 of the outer male thread 14 corresponds to the portion of the tapered portion 242 of the outer female thread 24 that has a thread diameter increasing as it goes outward along the pipe-axis direction, i.e. portion excluding the end portion adjacent to the box shoulder surface 25. The tapered portions 141 and 142 have a thread diameter that gradually increases as it goes outward along the pipe-axis direction. The parallel portion 143 of the outer male thread 14 (FIG. 1) corresponds to the end portion of the tapered portion 242 adjacent to the box shoulder surface 25. The parallel portion 143 includes a plurality of thread crests with the same diameter (not shown) in a longitudinal cross-sectional view of the pin 1.

In a longitudinal cross-sectional view of the pin 1, the tapered portion 141 includes a plurality of thread crests 141b. In a longitudinal cross-sectional view, thread crests 141a located outward as determined along the pipe-axis direction have larger diameters than thread crests 141b located inward as determined along the pipe-axis direction. When the connection has been made up, the thread crests 141b face the thread roots 241b of the parallel portion 241 of the outer female thread 24.

The thread height in the parallel portion 241 of the outer female thread 24 is larger than the thread height in the tapered portion 141 of the outer male thread 14. For example, the difference between the outermost diameter and innermost diameter of the load flank 241c in the parallel portion 241 is larger than the difference between the outermost diameter and innermost diameter in the load flank 141c in the corresponding tapered portion 141.

The parallel portion 241 of the outer female thread 24 has an amount of interference with respect to the tapered portion 141 of the outer male thread 14. That is, when the connection is not made up, the diameter of the thread roots 241b of the parallel portion 241 is larger than the maximum diameter of the thread crests 141b of the corresponding tapered portion 141. However, the amount of interference between the parallel portion 241 and tapered portion 141 is smaller than the amount of interference between the box outer sealing surface 22 and the pin outer sealing surface 12.

The difference in diameter between adjacent thread crests 141b in the tapered portion 141 of the outer male thread 14 in a longitudinal cross-sectional view of the pin 1 when the connection is not made up will be denoted by Dc. The difference between the diameter of the thread roots 241b of the parallel portion 241 of the outer female thread 24 and the minimum diameter of the box outer sealing surface 22 in a longitudinal cross-sectional view of the box 2 when the connection is not made up will be denoted by Dd. The pin 1 and box 2 are designed such that Dd is larger than Dc. That is, Dc<Dd when the connection is not made up.

When the connection is not made up, the minimum diameter of the box outer sealing surface 22 is larger than the maximum diameter of the thread crests 141b of the tapered portion 141 of the outer male thread 14. The minimum diameter of the box outer sealing surface 22 may be represented by the diameter of the end, adjacent to the outer female thread 24, of the box outer sealing surface 22 having a diameter that substantially decreases toward the outer female thread 24. The minimum diameter of the box outer sealing surface 22 is larger than the diameter of the thread roots 241b of the parallel portion 241.

In the present embodiment, the box 2 includes a cylindrical portion 26 located between the outer female thread 24 and box outer sealing surface 22. The cylindrical portion 26 has a substantially constant inner diameter. The inner diameter of the cylindrical portion 26 is larger than the diameter of the thread roots 241b of the parallel portion 241. The inner diameter of the cylindrical portion 26 is substantially equal to the minimum diameter of the box inner sealing surface 22. The inner peripheral surface of the cylindrical portion 26 is not in contact with the pin 1 when the connection has been made up.

[Process of Make-Up of Threaded Connection]

The threaded connection 10 constructed as described above prevents the tip portion of the pin 1 from contacting the box 2 during make-up of the pin 1 and box 2. The process of make-up of the pin 1 and box 2 will be described below.

Figure 4:
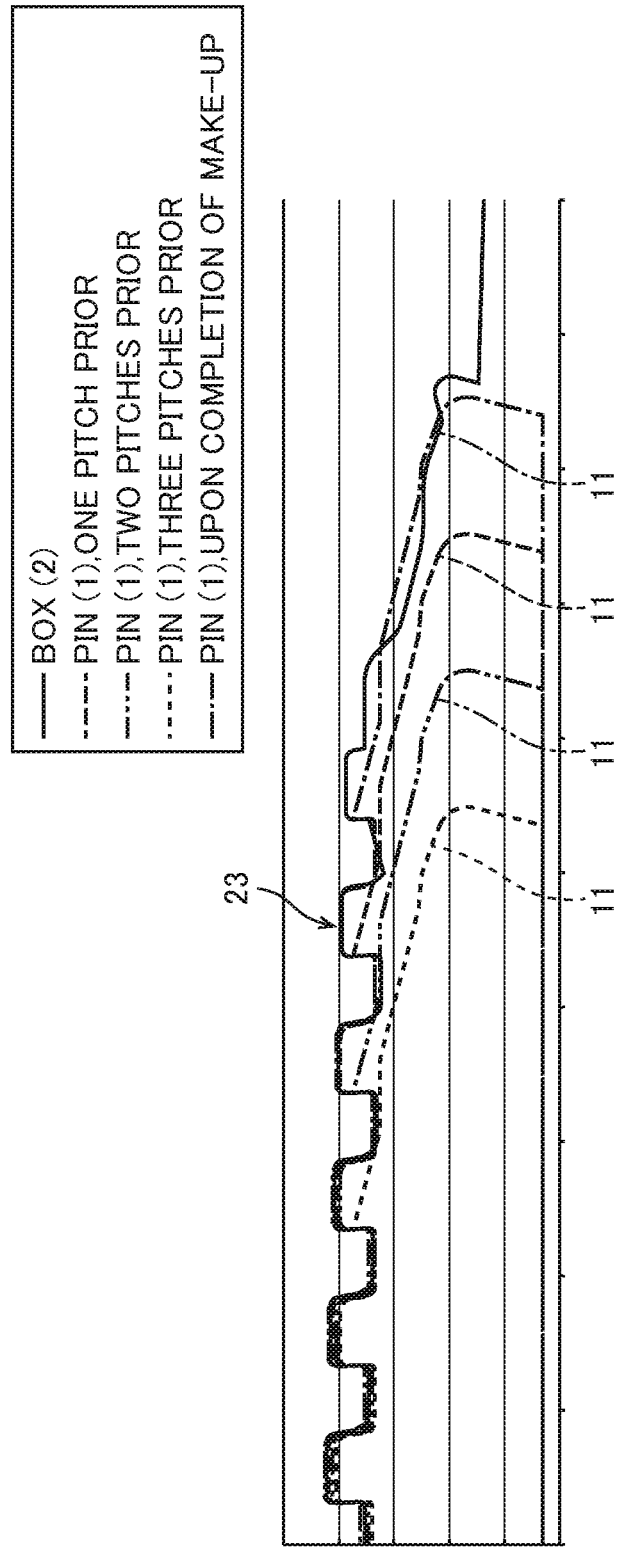
FIG. 4 is a longitudinal cross-sectional view of an as-designed pin and box as superimposed on each other, as found at various steps beginning with three pitches before completion of make-up and ending with the completion of make-up.

FIG. 4 is a longitudinal cross-sectional view of the pin 1 as superimposed on the box 2, as found at various steps beginning with three pitches before completion of make-up and ending with the completion of make-up. FIG. 4 does not take the deformation of the pin 1 during make-up into consideration and simply shows an as-designed pin 1 and box 2 (not made up) superimposed upon each other.

As shown in FIG. 4, as the pin 1 is tightened into the box 2 without a change to their representation in the design drawing, the pin inner sealing surface 11 comes quite close to the inner female thread 23 of the box 2 in the course of the make-up, and the pin inner sealing surface 11 contacts thread crests of the inner female thread 23 that are located in the portions of the inner female thread 23 having relatively small thread diameters. That is, assuming no deformation of the pin 1, the pin inner sealing surface 11 strongly contacts the inner female thread 23 of the box 2 during make-up, potentially causing galling.

In reality, during make-up, the presence of interference of the inner threads and inner seal deforms the pin 1 such that its diameter decreases. This point will be discussed with reference to FIGS. 5 to 8.

Figure 5:
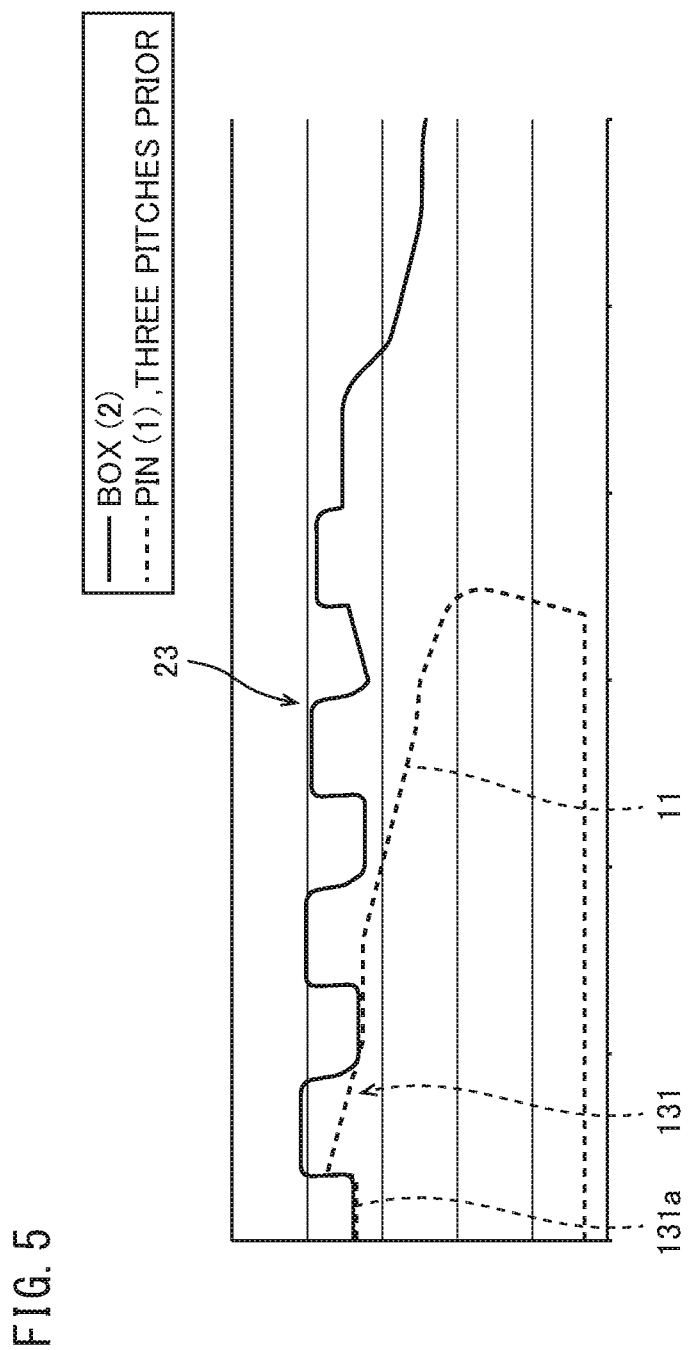
FIG. 5 is a longitudinal cross-sectional view of the pin and box, as found three pitches before completion of make-up during a real make-up process.

FIG. 5 is a longitudinal cross-sectional view of the pin 1 and box 2 as found three pitches before completion of make-up during a real make-up process. At the time of three pitches before completion of make-up, the innermost thread root 131a in the parallel portion 131 of the inner male thread 13 of the pin 1 is not in contact with the inner female thread 23 of the box 2. The pin inner sealing surface 11 is not in contact with the inner female thread 23, either.

Figure 6:
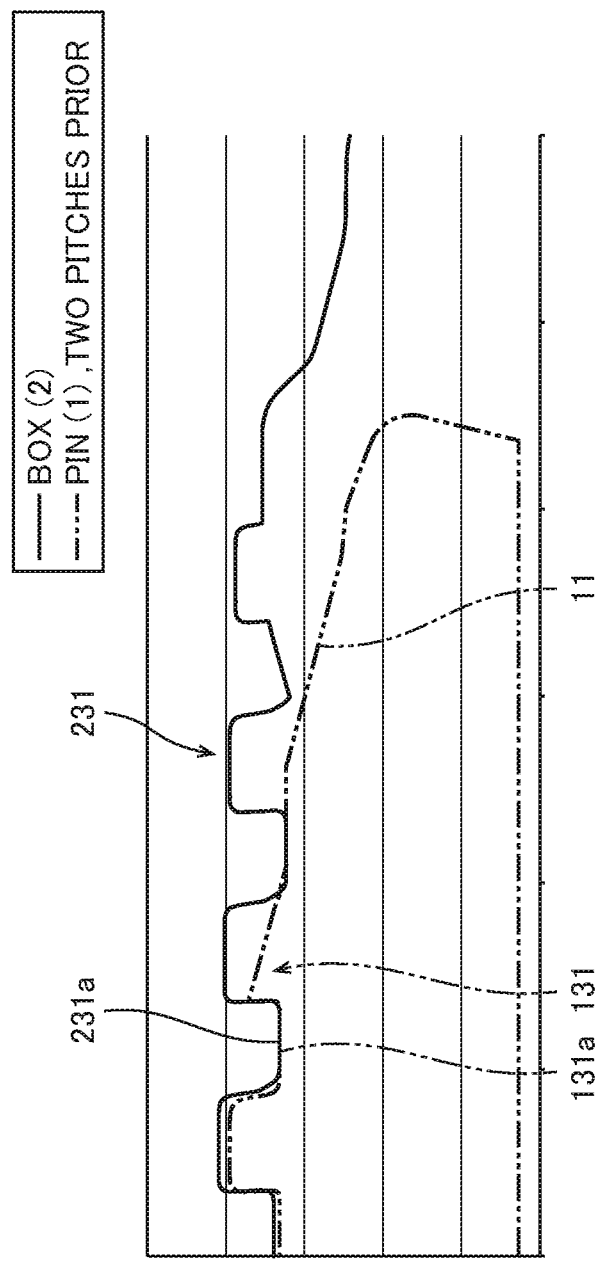
FIG. 6 is a longitudinal cross-sectional view of the pin and box, as found two pitches before completion of make-up during a real make-up process.

FIG. 6 is a longitudinal cross-sectional view of the pin 1 and box 2, as found two pitches before completion of make-up during a real make-up process. At the time of two pitches before completion of make-up, the innermost thread root 131a in the parallel portion 131 contacts a thread crest 231a in the tapered portion 231 of the inner female thread 23. This causes the diameter of portions of the pin 1 that are near the pin inner sealing surface 11 to decrease. As such, the pin inner sealing surface 11 does not contact the inner female thread 23.

As discussed above, the difference Db between the diameter of the thread roots 131a of the parallel portion 131 and the maximum diameter of the pin inner sealing surface 11 is larger than the difference Da between the diameters of adjacent thread crests 231a in the tapered portion 231 (FIG. 2). As such, during make-up, the parallel portion 131 contacts the tapered portion 231 before the pin inner sealing surface 11 contacts the box 2. Once a thread root 131a of the parallel portion 131 interferes with a thread crest 231a of the tapered portion 231, the pin inner sealing surface 11 does not interfere with a crest of the tapered portion 231 until completion of make-up.

Figure 7:
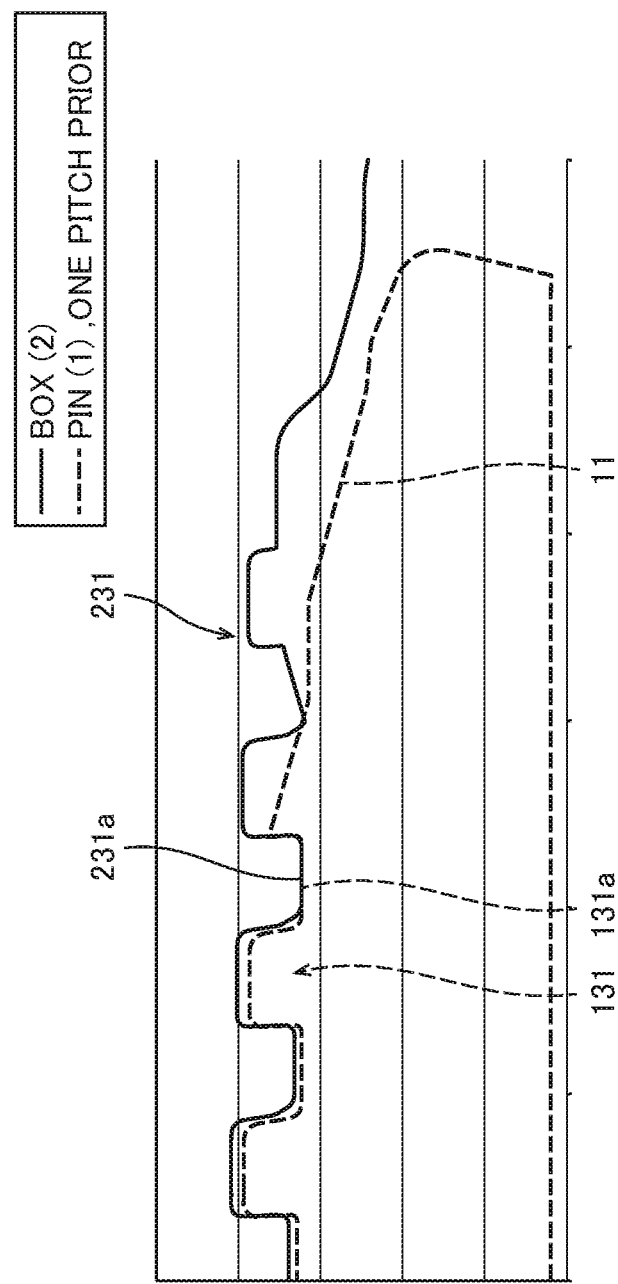
FIG. 7 is a longitudinal cross-sectional view of the pin and box, as found one pitch before completion of make-up during a real make-up process.

FIG. 7 is a longitudinal cross-sectional view of the pin 1 and box 2, as found one pitch before completion of make-up during a real make-up process. Even when the pin 1 continues to be screwed into the box 2, the innermost thread root 131a in the parallel portion 131 of the inner male thread 13 continues to interfere with a thread crest 231a of the tapered portion 231 of the inner female thread 23. As such, again, the pin inner sealing surface 11 does not contact the tapered portion 231.

Figure 8:
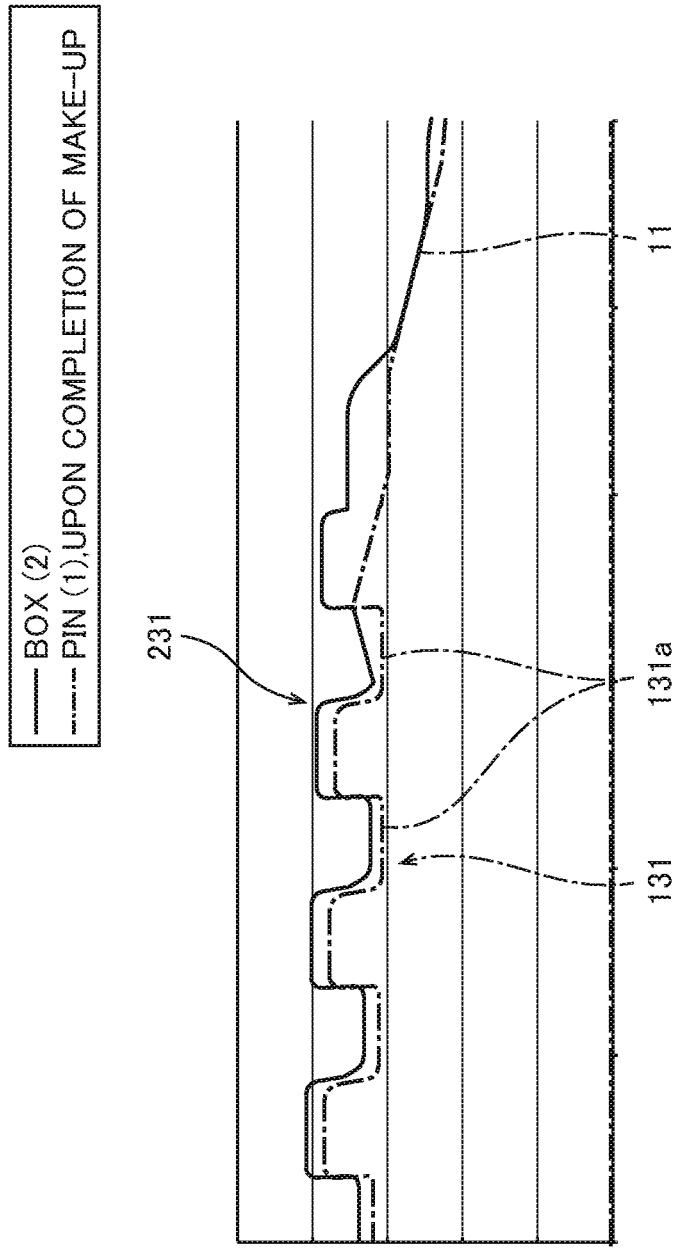
FIG. 8 is a longitudinal cross-sectional view of the pin and box as found upon completion of make-up.

FIG. 8 is a longitudinal cross-sectional view of the pin 1 and box 2 as found upon completion of make-up. Upon completion of make-up, the pin inner sealing surface 11 and box inner sealing surface 21 are in contact with each other to form an inner seal. Since the amount of interference in the inner seal is larger than the amount of interference between the parallel portion 131 of the inner male thread 13 and the tapered portion 231 of the inner female thread 23, upon completion of make-up, the thread roots 131a of the parallel portion 131 are not in contact with the tapered portion 231.

[Effects]

According to the present embodiment, the parallel portion 131 of the inner male thread 13 of the pin 1 includes a plurality of thread roots 131a that are parallel to the pipe axis CL and have the same diameter. On the other hand, the tapered portion 231 of the inner female thread 23 of the box 2 has a thread diameter that decreases toward the box inner sealing surface 21. Further, the thread height for the tapered portion 231 is larger than the thread height for the parallel portion 131. Thus, when the connection has been made up, the gaps between thread crests 231a of the tapered portion 231 and thread roots 131a of the parallel portion 131 are relatively small. As such, even if a load from the internal or external pressure is applied to the threaded connection 10 and the pin 1 is deformed, thread roots 131a contact thread roots 231a at an early stage. This reduces the deformation of portions of the pin 1 near the inner seal, thereby providing high sealing performance.

According to the present embodiment, thread crests in portions of the inner female thread 23 of the box 2 that are adjacent to the inner seal are not cut, and thus a sufficient thread height is provided. This increases the length of the portions of the inner female thread and inner male thread 13 that completely engage each other. This reduces the deformation of the pin 1 or box 2 in response to a tensile and compression load, thereby providing still higher sealing performance.

According to the present embodiment, the difference Db between the diameter of the thread roots 131a of the parallel portion 131 of the inner male thread 13 and the maximum diameter of the pin inner sealing surface 11 is larger than the difference Da between the diameters of adjacent thread crests 231a of the tapered portion 231 of the inner female thread 23. As discussed above, this prevents the pin inner sealing surface 11 from contacting the inner female thread 23 during make-up.

According to the present embodiment, a parallel portion 241 is also provided for the outer female thread 24 of the box 2. The parallel portion 241 includes a plurality of thread roots 241b that are parallel to the pipe axis CL and have the same diameter. On the other hand, the tapered portion 141 of the outer male thread 14 of the pin 1 has a thread diameter that increases toward the pin outer sealing surface 12. The thread height for the tapered portion 141 is smaller than the thread height for the parallel portion 241. Thus, toward the connections outer end as determined along the pipe-axis direction, the gaps between thread roots 241b of the parallel portion 241 and thread crests 141b of the tapered portion 141 are relatively small when the connection has been made up, thereby causing such roots and crests to contact at an early stage during application of a load. Further, the length of the portions of the outer male thread 14 and outer female thread 24 that completely engage each other is increased. This reduces the deformation of portions of the threaded connection 10 that are near the outer seal, thereby further improving sealing performance.

According to the present embodiment, the difference Dd between the diameter of the thread roots 241b of the parallel portion 241 of the outer female thread 24 and the minimum diameter of the box outer sealing surface 22 is larger than the difference Dc between the diameters of adjacent thread crests 141b of the tapered portion 141 of the outer male thread 14. Although no detailed description thereof will be given since the principle behind it is the same as that for the prevention of contact between the pin inner sealing surface 11 and inner female thread 23, this construction prevents the box outer sealing surface 21 from contacting the outer male thread 24 during make-up.

Alternatively, no parallel portion 241 may be provided on the outer female thread 24. That is, the entire outer female thread 24 may be constituted by a tapered female thread.

Although embodiments have been described, the present disclosure is not limited to the above-described embodiments, and various modifications are possible without departing from the spirit of the disclosure.

EXAMPLES

To verify the effects of the threaded connection according to the present disclosure, a numerical simulation analysis was conducted using the elastic-plastic finite element method.

The elastic-plastic finite element analysis used a model of the threaded connection (10) having the construction shown in FIGS. 1 to 3 as an inventive example, and used as a comparative example a model of a threaded connection having basically the same construction as the threaded connection (10) except that thread crests in an inner end portion, as determined along the pipe-axis direction, of the inner female thread (23) and an outer end portion, as determined along the pipe-axis direction, of the outer male thread (14) had been cut. For each of the models of the inventive and comparative examples, loads from the internal and external pressures complying with ISO 13679 CAL IV: 2011 were applied, and the resulting amounts of plastic deformation were compared.

Figure 9:
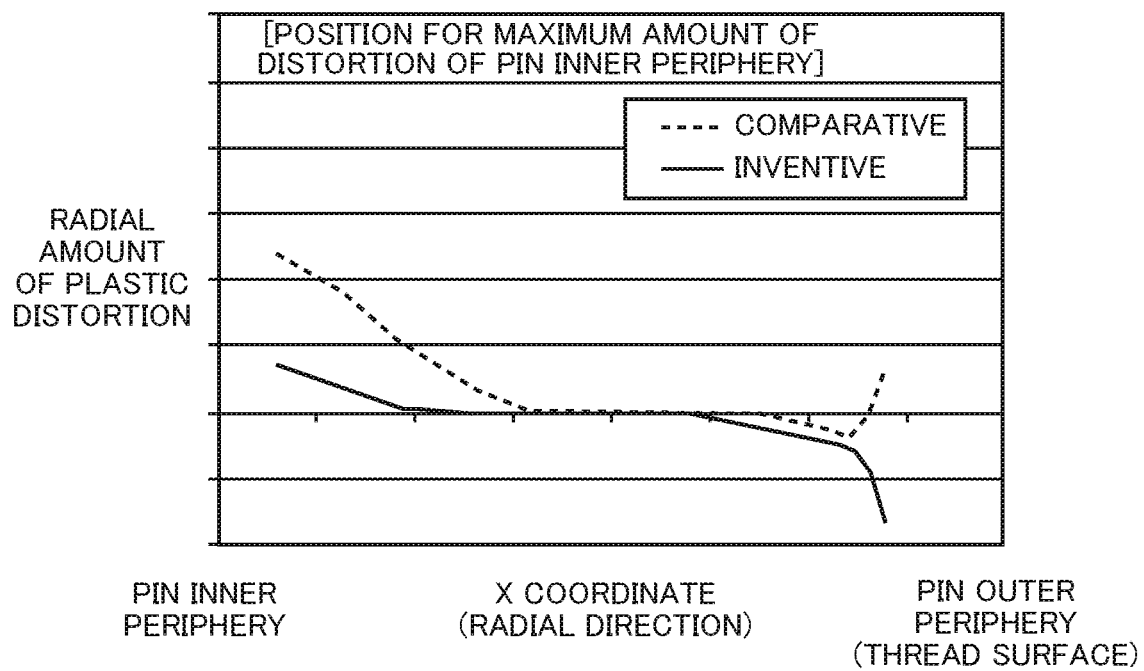
FIG. 9 is a graph showing the amount of plastic deformation (i.e. amount of plastic distortion) of the pin upon application of external and internal pressures for each of an inventive example and a comparative example.
Figure 10:
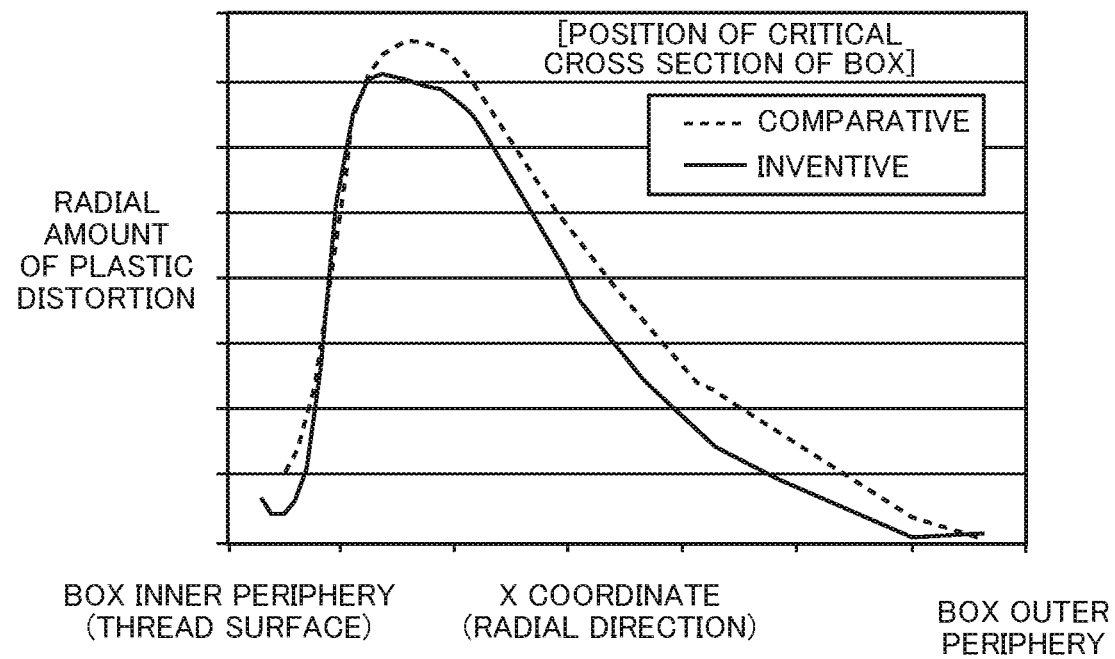
FIG. 10 is a graph showing the amount of plastic deformation (i.e. amount of plastic distortion) of the box upon application of external and internal pressures for each of the inventive and comparative examples.

FIGS. 9 and 10 are graphs each showing the amount of plastic deformation (i.e. amount of plastic distortion) upon application of internal and external pressures for each of the inventive and comparative examples. FIG. 9 shows the amount of plastic distortion of the pin (1) as measured at a position adjacent to the inner end as determined along the pipe-axis direction (i.e. position at which the distortion of the inner peripheral surface of the pin (1) is at the maximum). FIG. 10 shows the amount of plastic distortion of the box (2) as measured at the position of the critical cross section of the pin (1) and box (2) (i.e. position of the engagement edge between the inner male thread (13) and inner female thread (23)).

FIG. 9 demonstrates that the amount of plastic distortion of the inventive examples was smaller than that for the comparative example with cut thread crests, especially toward the inner periphery of the pin (1), since the thread height for the tapered portion (231) of the inner female thread (23) was larger than the thread height for the corresponding parallel portion (131) of the inner male thread (13). Further, FIG. 10 demonstrates that the amount of plastic distortion of the box (2) for the inventive example was smaller than that for the comparative example.

These results demonstrate that the threaded connection according to the present disclosure reduces the amount of plastic deformation of portions near the seals, thereby providing high sealing performance.

The invention claimed is:

1. A threaded connection for connecting steel pipes, comprising:
    a pin constituting a pipe end portion of one steel pipe; and
    a box constituting a pipe end portion of another steel pipe, the pin being inserted into the box such that the box and the pin are made up,
    wherein the pin includes:
    a pin inner sealing surface formed on an outer periphery of the pin at a tip portion thereof;
    a pin outer sealing surface formed on the outer periphery of the pin at an end portion thereof adjacent to a pipe body of the one steel pipe;
    an inner male thread located between the pin inner sealing surface and the pin outer sealing surface, the inner male thread being formed on the outer periphery of the pin;
    an outer male thread located between the pin inner sealing surface and the pin outer sealing surface and closer to the pin outer sealing surface than the inner male thread, the outer male thread being formed on the outer periphery of the pin; and
    a pin shoulder surface located between the inner male thread and the outer male thread, the pin shoulder surface being formed on the outer periphery of the pin,
    the box includes:
    a box inner sealing surface formed on an inner periphery of the box to correspond to the pin inner sealing surface, the box inner sealing surface being in contact with the pin inner sealing surface when the connection has been made up;
    a box outer sealing surface formed on the inner periphery of the box to correspond to the pin outer sealing surface, the box outer sealing surface being in contact with the pin outer sealing surface when the connection has been made up;
    an inner female thread formed on the inner periphery of the box to correspond to the inner male thread, the inner female thread mating with the inner male thread when the connection has been made up;
    an outer female thread formed on the inner periphery of the box to correspond to the outer male thread, the outer female thread mating with the outer male thread when the connection has been made up; and
    a box shoulder surface formed on the inner periphery of the box to correspond to the pin shoulder surface, the box shoulder surface being in contact with the pin shoulder surface when the connection has been made up,
    wherein the inner male thread includes a first parallel portion located at an end portion of the inner male thread adjacent to the pin inner sealing surface, the first parallel portion including a plurality of thread roots parallel to a pipe axis of the one steel pipe in a longitudinal cross-sectional view of the pin, the thread roots having the same diameter,
    the inner female thread includes a first tapered portion facing the first parallel portion when the connection has been made up, the first tapered portion having a thread height larger than that in the first parallel portion and a thread diameter decreasing toward the box inner sealing surface,
    the pin inner sealing surface has a maximum diameter larger than a minimum diameter of a thread crest in the first tapered portion, and
    $Da < Db$ is satisfied, where $Da$ is a difference in diameter between adjacent thread crests in the first tapered portion in a longitudinal cross section of the pin and the box as found when the connection is not made up, and $Db$ is a difference between the diameter of the thread roots in the first parallel portion and the maximum diameter of the pin inner sealing surface.

2. The threaded connection according to claim 1, wherein the outer female thread includes a second parallel portion located at an end portion of the outer female thread adjacent to the box outer sealing surface, the second parallel portion including a plurality of thread roots parallel to a pipe axis of the other steel pipe in a longitudinal cross-sectional view of the box, the thread roots having the same diameter,
    the outer male thread includes a second tapered portion facing the second parallel portion when the connection has been made up, the second tapered portion having a thread height smaller than that in the second parallel portion and a thread diameter increasing toward the pin outer sealing surface,
    the box outer sealing surface has a minimum diameter larger than a maximum diameter of a thread crest in the second tapered portion, and
    $Dc < Dd$ is satisfied, where $Dc$ is a difference in diameter between adjacent thread crests in the second tapered portion in a longitudinal cross section of the pin and the box as found when the connection is not made up, and $Dd$ is a difference between the diameter of the thread roots in the second parallel portion and the minimum diameter of the box outer sealing surface.

* * * * *